United States Patent
Park et al.

(10) Patent No.: US 8,787,994 B2
(45) Date of Patent: Jul. 22, 2014

(54) MOBILE TERMINAL AND METHOD FOR PREVENTING UNINTENDED OPERATION OF THE SAME

(75) Inventors: Dong Joon Park, Gyeongsangbuk-do (KR); Young Sik Kim, Gyeongsangbuk-do (KR); Bum Soo Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 447 days.

(21) Appl. No.: 12/701,911

(22) Filed: Feb. 8, 2010

(65) Prior Publication Data

US 2010/0216447 A1    Aug. 26, 2010

(30) Foreign Application Priority Data

Feb. 26, 2009  (KR) .................. 10-2009-0016288
Mar. 11, 2009  (KR) .................. 10-2009-0020885

(51) Int. Cl.
   *H04M 1/00* (2006.01)
   *H04M 1/02* (2006.01)
   *G06F 1/16* (2006.01)

(52) U.S. Cl.
   CPC ........... *H04M 1/0235* (2013.01); *G06F 1/1624* (2013.01)
   USPC ...................... 455/575.4; 455/566

(58) Field of Classification Search
   CPC .............. H04M 1/72519; H04M 1/72583; H04M 1/72522; H04M 1/0237; H04M 1/0235; G06F 1/1624
   USPC ................ 455/566, 575.4; 345/173–178
   See application file for complete search history.

(56) References Cited

U.S. PATENT DOCUMENTS

| | | | |
|---|---|---|---|
| 6,246,395 B1 * | 6/2001 | Goyins et al. ................. | 345/173 |
| 6,545,669 B1 * | 4/2003 | Kinawi et al. ................. | 345/173 |
| 7,899,499 B2 * | 3/2011 | Kang et al. .................... | 455/566 |
| 2006/0077183 A1 * | 4/2006 | Studt .............................. | 345/173 |
| 2009/0061947 A1 * | 3/2009 | Park et al. ..................... | 455/566 |

FOREIGN PATENT DOCUMENTS

| | | |
|---|---|---|
| EP | 1758345 | 2/2007 |
| EP | 1780992 | 5/2007 |
| EP | 2031837 | 3/2009 |

OTHER PUBLICATIONS

Patel, Chirag K.; Patent Application Publication No: US 2008/0129554 A1; Publication Date: Jun. 5, 2008; "Methods and Devices for Keypress Validation in a Slider Form Factor . . . ;". . . .

* cited by examiner

*Primary Examiner* — Vladimir Magloire
(74) *Attorney, Agent, or Firm* — Cha & Reiter, LLC

(57) ABSTRACT

A slide type mobile terminal and a method for preventing unintended operation of the same are disclosed. When an event is generated, indicating movement of the assemblies of the mobile terminal with respect to each other, a determination is made whether the movement is detected within a preset time after generation of at least one of a touch down event and a touch up event, and ignores those events determined to be within the preset time by not delivering the touch events to a related application program.

16 Claims, 8 Drawing Sheets

MOBILE TERMINAL AND METHOD FOR PREVENTING UNINTENDED OPERATION OF THE SAME

CLAIM OF PRIORITY

This application claims priority from and the benefit of Korean Patent Application No. 10-2009-0016288, filed on Feb. 26, 2009 and Korean Patent Application No. 10-2009-20885, filed on Mar. 11, 2009, the contents of which are hereby incorporated by reference for all purposes as if fully set forth herein.

BACKGROUND OF THE INVENTION

1. Field of the Invention

The present invention relates generally to a mobile terminal and, more particularly, to a method for preventing unintended operation of a slide-type mobile terminal caused by accidental user input.

2. Description of the Related Art

Mobile terminals supporting mobility have entered into widespread use. An advanced mobile terminal may have various functions related to, for example, audio file playback through an MP3 player, image capture through a digital camera module, and mobile gaming or arcade gaming.

Mobile terminals may be classified into a slide type, folder type, flip type, bar type and the like. In particular, slide-type mobile terminals are popular because they are smaller in size, suitable for one-handed manipulation and provide relatively wide screens. Many slide-type mobile terminals provide touch screens having a touch sensor as an input means. However, when opening and closing the slide of a slide-type mobile terminal, the user is prone to accidentally touch a portion of the touch screen causing the mobile terminal to execute an unintended operation.

SUMMARY OF THE INVENTION

The present invention provides a means for preventing an unintended operation of a slide-type mobile terminal by suppressing accidental user input.

In accordance with an exemplary embodiment of the present invention, there is provided a method for preventing unintended operation of a mobile terminal, including: activating a touch sensor on a touch screen; generating in response to the activated touch sensor, at least one of a touch down event and a touch up event; generating a sliding event corresponding to a sliding motion and ignoring the generated at least one touch down event and the touch up event when said sliding event occurs with a preset time of at least one of the touch down event and the touch event by not delivering the touch events to a related application program.

In accordance with another exemplary embodiment of the present invention, there is provided a mobile terminal, which is capable of preventing unintended operation the terminal comprises a first assembly having a touch screen composed of a display unit and a touch sensor placed on the display unit, and a second assembly coupled to the first assembly and supporting sliding movement of the first assembly, the mobile terminal including: a movement sensor generating a movement event corresponding to a movement of the first assembly with respect to the second assembly; and a control unit ignoring, when a movement event corresponding to movement motion is generated within a preset time after generation of a touch down event from the touch sensor, the touch down event by not delivering the touch down event to a related application program.

In a feature of the present invention, the user does not have to be inconvenienced by an unintended operation of the slide-type mobile terminal caused by accidental input.

BRIEF DESCRIPTION OF THE DRAWINGS

The features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described in detail with reference to the accompanying drawings. The same reference symbols, where possible, are used throughout the drawings to refer to the same or like parts. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

In the description, a "touch down" event is an event that is generated when the finger or other object is brought into contact with a portion of the display unit accommodating a touch sensor. A "touch up" event is an event that is generated when the finger or other object is removed from a touched portion of the display unit. In addition, the term "slide" while depicted as being related to vertical displacement of one assembly with respect to another, it would be recognized that this term may also be related to assemblies that move horizontally or rotationally with respect to one another. Hence, while the term "slide" is referred to herein, one would recognize that the term "movement" is more applicable and to be generally applied.

Figure 1:
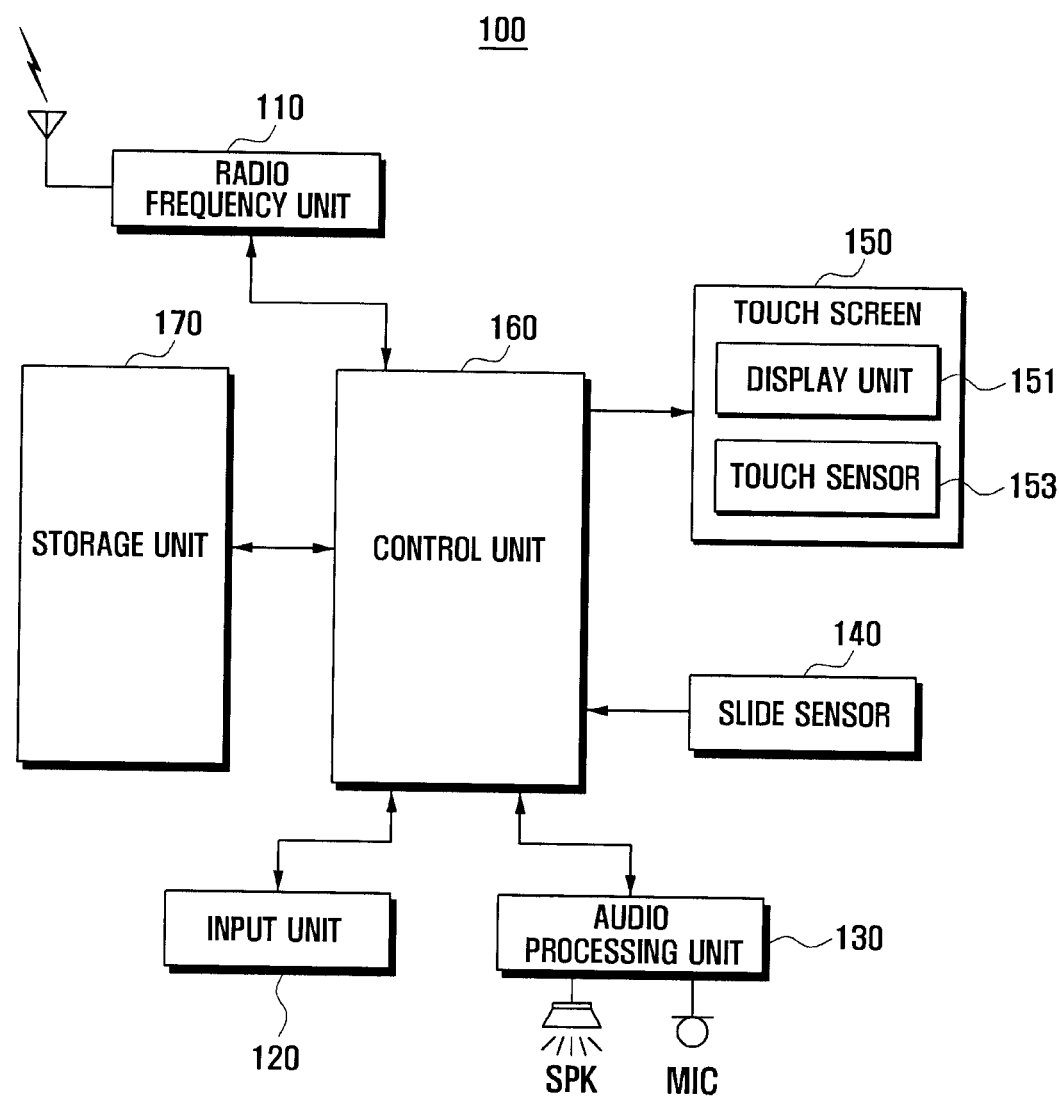
FIG. 1 is a block diagram of a mobile terminal according to an exemplary embodiment of the present invention.

FIG. 1 is a block diagram of a mobile terminal 100 according to an exemplary embodiment of the present invention.

Referring to FIG. 1, the mobile terminal 100 may include a radio frequency unit 110, an input unit 120, an audio processing unit 130, a slide sensor 140, a touch screen 150, a storage unit 170, and a control unit 160.

The mobile terminal 100 having the above configuration may determine validity of a touch event (such as touch down/up or press/release) generated by a touch sensor 153 of the touch screen 150 and perform a corresponding operation according to a sliding event generated by the slide sensor 140. Next, the configuration is described in detail.

The radio frequency unit 110 establishes a communication channel for voice, video and data communication under the control of the control unit 160. That is, the radio frequency unit 110 establishes a communication channel for a voice call, a data call and/or a video call to a mobile communication system. To achieve this, the radio frequency unit 110 may include a radio frequency transmitter for up-converting the frequency of a signal to be transmitted and amplifying the signal, and a radio frequency receiver for low-noise amplifying a received signal and down-converting the frequency of the received signal. Under the control of the control unit 160, the radio frequency unit 110 may be activated according to a touch event generated by the touch sensor 153. The radio frequency unit 110 may also be activated in the slide open state or deactivated in the slide closed state according to user settings or requests. For example, activation of the radio frequency unit 110 may be determined according to a touch event generated by the touch sensor 153 when the mobile terminal 100 is in the slide closed state. Activation of the radio frequency unit 110 may be determined according to one of a touch event generated by the touch sensor 153 and an input signal from the input unit 120 when the mobile terminal 100 is in the slide open state.

The input unit 120 includes a plurality of alphanumeric and function keys for inputting alphanumeric information and for setting various functions. The function keys may include direction, side, and shortcut keys associated with specific functions. The input unit 120 transmits key signals from the user for setting and controlling the mobile terminal 100 to the control unit 160. The input unit 120 may include a qwerty keypad, a 3*4 keypad, or a 4*3 keypad, including multiple keys. The input unit 120 transmits a key signal generated by the user pressing a specific key of the keypad to the control unit 160, and may generate various input signals according to a currently activated application program.

The audio processing unit 130 includes a speaker SPK for outputting incoming and outgoing audio data during a call, and a microphone MIC for collecting an audio signal such as a voice signal during a call. In particular, the audio processing unit 130 may output a sound indicating transition between the slide-open state and the slide-closed state. That is, the audio processing unit 130 may output a preset sound when the mobile terminal 100 is transitioned from the slide-closed state to the slide-open state or from the slide-open state to the slide-closed state. The audio processing unit 130 may output a preset sound when a touch event is generated by the touch sensor 153. When a touch event and a sliding event are generated simultaneously, the audio processing unit 130 may output a preset alert sound or vibration.

The slide sensor 140 is installed between a first assembly and a second assembly of the mobile terminal 100, and generates a sliding event corresponding to sliding movement of the two assemblies. The slide sensor 140 generates a sliding event when the mobile terminal 100 transitions from the slide-open state to the slide-closed state or from the slide-closed state to the slide-open state. The slide sensor 140 may be realized using various means. For example, the slide sensor 140 may be a mechanical switch member placed between the first assembly and the second assembly. The switch member may be turned on for the slide open state when the first assembly slides in front of second assembly, and may be turned off when the back of the first assembly faces the front of the second assembly (slide closed state). The slide sensor 140 may be one or more optical sensing members attached on the front of the second assembly, and may identify the slide state by sensing the amount of light received at the light receiving part. The slide sensor 140 may be one or more Hall effect sensors sensing movement of the first assembly and the second assembly.

The touch screen 150 includes a display unit 151 and a touch sensor 153. The touch sensor 153 may be arranged on the front of the display unit 151. The size of the touch screen 150 may depend on the area of the display unit 151 covered by the touch sensor 153.

The display unit 151 displays various menus, information input by the user, and information to be provided to the user. For example, the display unit 151 may output various screens related to utilization of the mobile terminal 100, such as an idle screen, menu screen, message composition screen, and call handling screen. In particular, the display unit 151 may display various menus and icons related to specific functions on the idle screen according to user settings. For example, when the user arranges various icons such as a clock icon, a schedule icon, and a message icon on the idle screen, the display unit 151 lists the icons at specified positions. The mobile terminal 100 may retain information on the locations of the icons, and display the icons at the original positions when awakened from the sleep state. When the user activates an icon, the display unit 151 may output a screen for an application program associated with the activated icon. Icons on the display unit 151 may be related respectively to widgets. The display unit 151 may be realized using liquid crystal display (LCD) devices or organic light emitting diodes (OLED).

The touch sensor 153 is installed at the display unit 151, and may generate a touch event according to contact with an object like a finger and send the touch event to the control unit 160. The touch sensor 153 may have an array of sensing elements covering the whole display unit 151, and may generate a touch event indicating a touch point on the display unit 151. The control unit 160 matches a touch point indicated by the touch event with the screen information of the display unit 151, and controls an operation to execute a function mapped to the touch point. When the user opens or closes the slide of the mobile terminal 100, the finger may be brought into contact with a zone covered by the touch sensor 153.

The storage unit 170 may store application programs related to the present invention, application programs for the slide sensor, application programs for playing back various media files, and key maps or menu maps for the touch screen capability. The key maps may correspond to various keyboards including a 3*4 keyboard and a QWERTY keyboard, and may include a control key map for controlling execution of an activated application program. The menu maps may include a menu map for controlling execution of an activated application program, and a menu map related to the menus of the mobile terminal 100. The storage unit 170 may include a program area and a data area.

The program area may store an operating system (OS) for booting and operating the mobile terminal 100, application programs for reproduction of various files, application programs for call-related functions, a browser for accessing a web server, application programs for playback of MP3 data, and application programs for viewing still images and moving images. In particular, the program area may store an application program for driving the slide sensor 140, an application program for driving the touch sensor of the touch screen, and a routine for preventing unintended operation caused by a touch event occurring during opening and closing of the slide. When a sliding event occurs within a preset time after generation of one of a touch down event and a touch up event, the routine may ignore the touch event occurring immediately before the sliding event. When a sliding event occurs within a preset time after generation of a touch down event and a touch up event occurs after occurrence of the sliding event, the routine may ignore the touch down event and the touch up event.

The data area may store data generated by the use of the mobile terminal 100, and various contents. The data area may store user data input through the touch screen. In particular, when a touch event is generated by the touch sensor 153, the data area may temporarily buffer the touch event and discard the buffered touch event at a later time under the control of the control unit 160 or after an predetermined time To be more specific, when a touch down event is generated by the touch sensor 153 according to a touch with the finger or a touch up event is generated owing to a release of the finger, the data area may temporarily store the touch down event and the touch up event. When a sliding event is generated by the slide sensor 140, the data area may temporarily store the sliding event. The temporarily stored touch up/down event and sliding event may be forwarded to the control unit 160. Thereafter, the control unit 160 may control the data area to discard the temporarily stored touch up/down event and/or the sliding event. When a touch down event is generated by the touch sensor 153 according to a touch with the finger and a sliding event is generated by the slide sensor 140 after generation of the touch down event, the data area may temporarily store the touch down event and the sliding event. Thereafter, the control unit 160 may control the data area to discard the temporarily stored touch down event and sliding event. In the case when the user opens and closes the slide of the mobile terminal 100, a touch down event may be immediately followed by a sliding event, or a touch down event and touch up event may be immediately followed by a sliding event. The touch down event, touch up event and sliding event may be buffered at the data area. Event buffering may also be performed by the control unit 160. Association between a touch event and a sliding event is further described later in connection with FIGS. 3 and 4.

Figure 2:
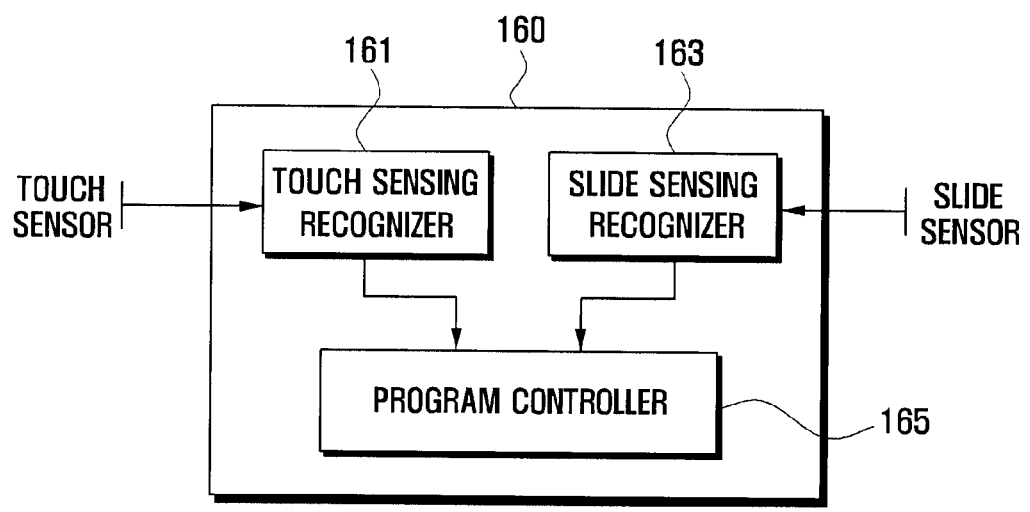
FIG. 2 is a detailed block diagram of a control unit of the mobile terminal of FIG. 1.

The control unit 160 controls supply of power to the components of the mobile terminal 100 for initialization and controls signal exchange between the components to prevent unintended operation. To achieve this, as shown in FIG. 2, the control unit 160 may include a touch sensing recognizer 161, a slide sensing recognizer 163, and a program controller 165.

The touch sensing recognizer 161 receives a touch event from the touch sensor 153 and forwards the touch event to the program controller 165. In this process, the touch sensing recognizer 161 may temporarily store a touch event in the data area of the storage unit 170 or in a buffer provided in the control unit 160. The touch sensing recognizer 161 may recognize a touch up event, a touch down event, and a touch drag event.

The slide sensing recognizer 163 receives a sliding event from the slide sensor 140 and forwards the sliding event to the program controller 165. In this process, the slide sensing recognizer 163 may temporarily store a sliding event in the data area of the storage unit 170 or in a buffer space provided in the control unit 160. The slide sensing recognizer 163 may directly forward a sliding event to the program controller 165 without temporary storage of the sliding event.

The program controller 165 receives a touch event from the touch sensing recognizer 161 and a sliding event from the slide sensing recognizer 163, determines validity of a specific touch event, and controls execution of the currently running program according to the determined validity. To be more specific, when a first touch event is followed by a second touch event within a preset time or is followed by no additional touch event within the preset time, the program controller 165 may control program execution according to the first touch event. The program controller 165 may regard the first touch event and second touch event as a single touch event, and may control program execution accordingly. For example, when a touch down event is followed by a touch up event, the program controller 165 may cause a function mapped to the touched location to be executed. When a touch down event and a touch up event are followed by a sliding event within a preset time, the program controller 165 may ignore the two events (i.e., touch down event and touch up event) and discard them from a buffer. Here, the preset time related to occurrence of a sliding event (referred to as touch event application time) may be varied depending upon different zones of the touch screen 150. That is, the program controller 165 may demarcate the touch screen 150 into multiple zones, and may allocate a longer touch event application time to the more frequently touched zone (for example, the central zone for a right-handed user) in opening and closing of the slide while the user grips the mobile terminal 100 in comparison to other zones. Hence, the activation time of an icon placed on the central zone of the touch screen 150 may be set differently from that of an icon placed another zone. In addition, the program controller 165 may allocate different touch event application times to individual zones according to different slide states. For example, the program controller 165 may allocate a longer touch event application time to the central zone of the touch screen 150 in the slide-closed state, and may allocate a longer touch event application time to a zone below the central zone in the slide-open state. Thereby, when a touch down event and a touch up event are followed by a sliding event within a preset time (which is varied based on the zone in which the events occurred), the program controller 165 may ignore the touch down event and touch up event.

As would be recognized, the preset time may be in the order of microseconds or milliseconds and may be determined by the terminal designer or the user (using a calibration function, for example) to determine a preset time that is suitable for the user. In addition, the touch allocation time may be comparable to a time that the touch event (touch-down, touch-up, extended touch) are stored or buffered so as to insure the events are maintained in a buffer for a sufficient amount of time so that the events are available in case a slide event is not detected.

As described above, when a touch down event or an extended touch down event (i.e., a touch drag) is followed by a sliding event within a preset time, the program controller 165 may ignore the touch down event to sustain the program in a current state. This is further described in connection with FIGS. 3 to 6.

Figure 3:
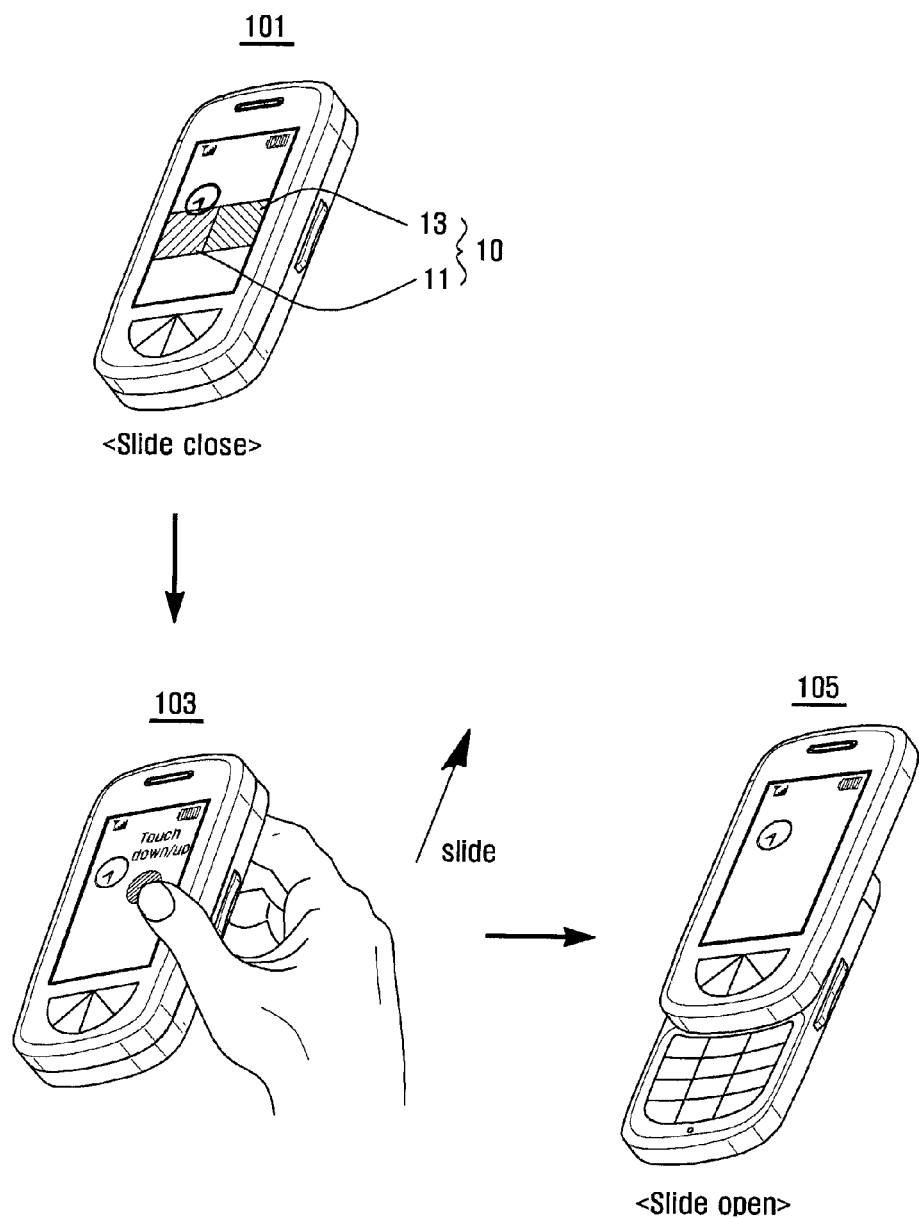
FIG. 3 is a first example depicting the external appearance of a slide type mobile terminal according to a slide opening operation.

FIG. 3 is a first example depicting prevention of an unintended operation when the mobile terminal is transitioned from the slide-closed state to the slide-open state.

In FIG. 3, as depicted by illustration 101, the mobile terminal is in the slide-closed state. After being turned on, the mobile terminal may display a preset screen related to a specific program such as an idle screen or a menu screen, or one or more preset icons. The icons may be related to functions that may be activated when depressed or engaged. For example, illustration 101 shows a clock icon (not labeled) displayed on the touch screen. Other icons or menu items (not shown) may also be displayed on zones of the touch screen. The touch screen may be demarcated into multiple zones, and different touch event application times may be assigned to different zones of the touch screen, as previously discussed. For example, in illustration 101, the hatched zone 10 (delay zone) has a longer touch event application time than other zones. When a touch event occurs at the central delay zone 10, the control unit may buffer the touch down event and touch up event and process the buffered touch down event and touch up event after expiration of the touch event application time assigned to the central delay zone 10.

The central delay zone 10 may be subdivided into a left central zone 11 and a right central zone 13, and the user may specify at least one of the left central zone 11 and the right central zone 13 as a delay zone. For example, a right-handed user may specify only the right central zone 13 as a delay zone, and a left-handed user may specify only the left central zone 11 as a delay zone.

The user may grip the mobile terminal placed in the slide-closed state as shown by illustration 101, and may touch a portion of the touch screen with a finger to open the slide of the mobile terminal. For example, to open the slide of the mobile terminal, the user may grip the slide type mobile terminal with the right hand by supporting the side and back of the mobile terminal with four fingers. Thereafter, the user may place the right thumb on the touch screen and apply a force upwards as shown by illustration 103. Here, the direction of a force applied to a mobile terminal may be determined according to the slide type of the mobile terminal. For example, if opening of the slide requires downward movement, the user may apply a downward force using the right thumb. If opening of the slide requires rotational, leftward, rightward, or diagonal movement, the user may apply a force using the right thumb in the corresponding direction.

When the right thumb touches a portion of the touch screen as shown by illustration 103, the mobile terminal may generate a touch down event. Thereafter, when the right thumb is released from the touch screen while opening the slide, the mobile terminal may generate a touch up event. As shown by illustration 105, the first assembly having the touch screen at the front may be slid over the second assembly having the input unit at the back. At this time, the mobile terminal may ignore touch events occurring immediately before (or during) the sliding event without delivering the touch events to the running application program.

In summary, when the user touches the central delay zone 10 of the touch screen as shown by illustration 103, for example, the control unit of the mobile terminal receives a touch event from the touch screen and is aware of occurrence of a touch down event at the central delay zone 10. When the user removes the finger from the central delay zone 10 while opening or closing the slide, the touch screen generates a touch up event. As a result, the mobile terminal generates a touch down event, a touch up event, and a sliding event, within a predetermined period of time. In the case where a touch down event and a touch up event are followed by a sliding event within a preset time (or if the touch up event and the sliding event are determined to be within a predetermined period of time from the touch down event), the mobile terminal may not deliver the touch down event and touch up event to the related program. That is, the touch down/touch up events may be ignored by the control unit.

For example, assume that a clock icon changes size or displays the current time in numeric form in response to a touch by the user, then in accordance with the principles of the invention, although a touch down event and a touch up event are generated by the thumb touching the clock icon and a sliding event is also detected to be within a preset time from the touch down event, the control unit of the mobile terminal may leave the clock icon unchanged. However, when a touch down event is not followed by a sliding event within the preset time or when a touch down event and a touch up event are not followed by a sliding event within the preset time, the control unit may deliver the touch event to the clock icon and control the behavior of the clock icon according to the touch event.

For example, when a touch down event is followed by a touch drag event, the control unit may perform a control operation corresponding to the touch event. That is, when a touch down event is followed by a touch drag event as to the clock icon, the control unit may cause the clock icon to be moved. In addition, when a touch down event is followed by a touch up event on the clock icon, the control unit may cause the clock icon to display the current time in numeric form. On the other hand, when a touch down event is followed by a touch drag event while the user opens or closes the slide, the control unit may not deliver the touch drag event to the related application program. That is, the control unit may have to determine whether a touch drag event occurring after a touch down event is generated intentionally by the use or is accidentally generated by opening or closing the slide. When a touch down event and a touch drag event are followed by a sliding event within a preset time (or the sliding event occurs during the period of time of the touch down event and the touch drag event, the control unit may ignore the touch drag event through event buffering.

In the above description, the user grips the mobile terminal with the right hand and opens or closes the slide with the thumb. However, the present invention is not limited thereto. That is, the present invention is not limited by grip patterns (right hand, left hand, or both hands), or slide movement directions. It is noted for the present invention that when a touch down event and a touch up event (or a touch down event and a touch drag event) are followed by a sliding event within a preset time (or detected during the preset time), the touch down event and touch up event (or the touch down event and touch drag event) may be ignored.

Figure 4:
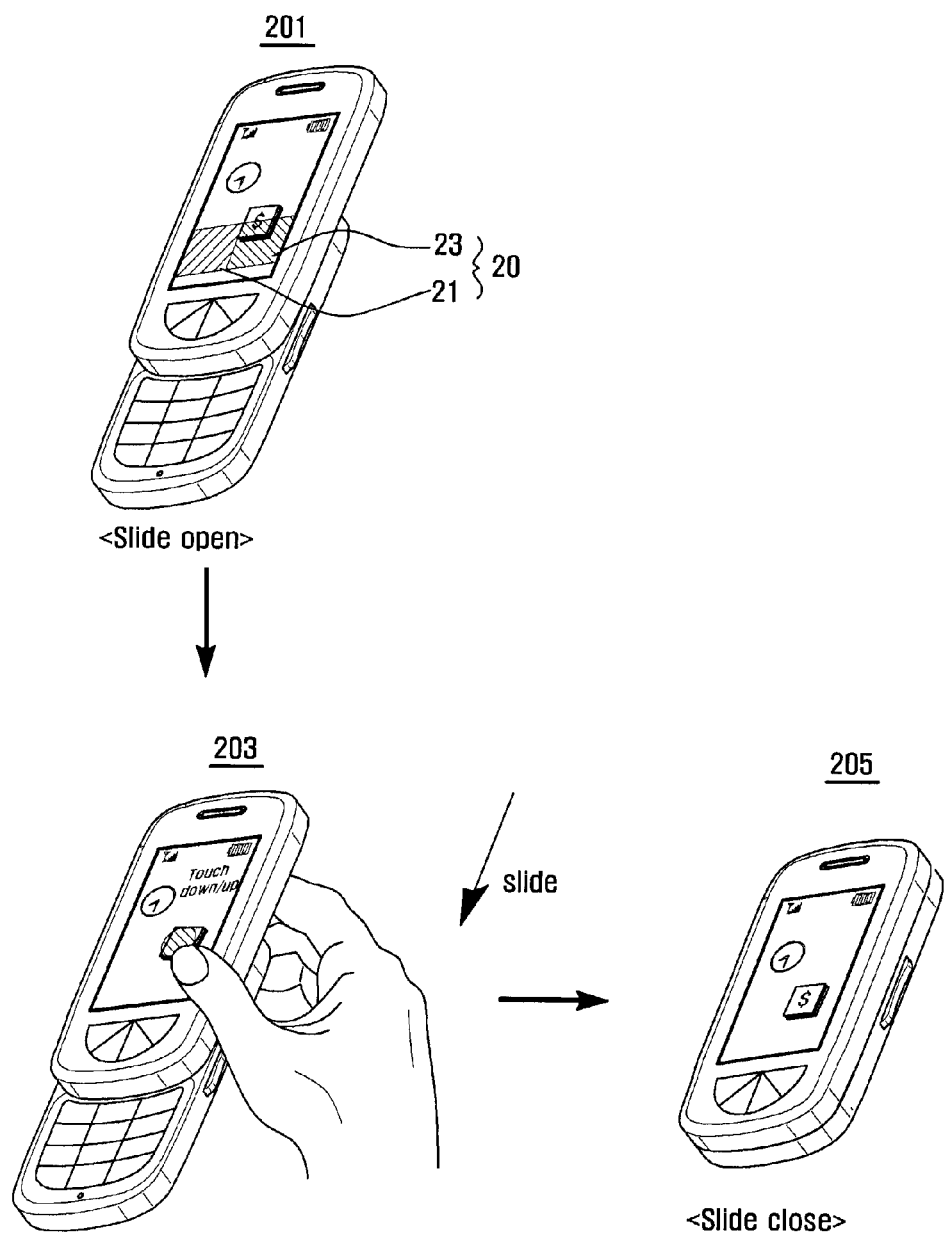
FIG. 4 is a first example depicting the external appearance of a slide type mobile terminal according to a slide closing operation.

FIG. 4 is a first example depicting prevention of an unintended operation when the mobile terminal is transitioned from the slide open state to the slide closed state.

In FIG. 4, as depicted by illustration 201, the mobile terminal is in the slide-open state. After being turned on, the mobile terminal may display, on the touch screen, a preset screen related to a specific program such as an idle screen or a menu screen, or one or more preset icons or menu items related to various application programs. For example, a clock icon or a stock icon labeled '$' may be displayed on the touch screen as shown in illustration 201. Other icons or menu items may also be displayed on zones of the touch screen. The clock icon and stock icon may be related to application programs that when executed perform functions related to the icon (i.e., display a current time/date or provide access to a web browser that obtains one or more stock quotations over a wireless network).

As shown in illustration 201, the control unit of the mobile terminal may set a delay zone 20 of the touch screen. Note that he stock icon ($) is depicted to be partially within the delay zone 20.

The lower delay zone 20 may be subdivided into a left zone 21 and a right zone 23. A longer touch event application time may be assigned to the delay zone 20 in comparison to other zones of the touch screen. That is, when a touch event occurs at the delay zone 20, the control unit may buffer the touch down event and touch up event and process the buffered touch down event and touch up event after expiration of the longer touch event application time assigned to the lower delay zone 20.

The buffering time for a touch down event and touch up event may be experimentally set by the designer. For example, the buffering time may be varied according to performance of the control unit. At least one of the left zone 21 and the right zone 23 may be specified as a delay zone by the user or by default. For example, a left-handed user may specify only the left zone 21 as a delay zone, and a right-handed user may specify only the right zone 23 as a delay zone.

The user may grip the mobile terminal placed in the slide-open state as shown by illustration 201, and may touch a portion of the touch screen with, for example, the thumb to close the slide as shown by illustration 203. To be more specific, to close the slide of the mobile terminal, the user may grip the mobile terminal, press a portion of the touch screen mounted on the first assembly with a finger or thumb, and move the pressed finger in a desired direction. When the mobile terminal supports automatic or semiautomatic sliding using a preset amount of elastic force, movement of a part of the mobile terminal while contact with the mobile terminal is sustained may cause the touch sensor to generate a touch down event followed by a touch up event and cause the slide sensor to generate a sliding event.

For example, when the thumb touches a portion of the touch screen, the touch sensor of the mobile terminal may generate a touch down event and send the touch down event to the control unit. The touch down event carries information on the touched location. As shown by illustration 203, the thumb touching the stock icon may cause the touch sensor to generate a touch down event carrying information regarding the touched location and to send the touch down event to the control unit. Hence, the control unit is aware of occurrence of a touch down event at the stock icon (clicking of the stock icon).

Thereafter, the user applies a force for sliding a first assembly of the mobile terminal with respect to a second assembly of the mobile terminal with the thumb and releases the thumb from the mobile terminal. This causes the touch sensor to generate a touch up event and to send the touch up event to the control unit. The applied force generates sliding motion of the mobile terminal, causing the slide sensor to generate a sliding event and to send the sliding event to the control unit.

Hence, the control unit may receive a touch down event and a touch up event from the touch sensor in the situation of illustration 203, and may receive a sliding event from the slide sensor in the situation of illustration 205. It should be noted that the order of receipt of the touch up and sliding events is depend upon the user's handling of the device. For example, if after the user grips the screen and a touch down event occurs, the user may maintain contact with the screen while sliding the device into a closed (or open) position. The user may, after the device is fully closed (or opened) release his hold of the screen. In this case, the sliding event may occur before the touch event is detected.

In the case where a touch down event and a touch up event from the touch sensor are followed by a sliding event within a preset time (or the touch up and sliding event occur a preset time after the touch down event), the control unit of the mobile terminal may not deliver the touch down event and touch up event to the related program. When the touch down event and touch up event are generated at the delay zone, the control unit may use a touch event application time longer than that of a non-delay zone (that is, the control unit awaits occurrence of a sliding event for a longer time).

In the description related to FIGS. 3 and 4, the location of a delay zone is set in advance. However, the location of the delay zone may be changed or reset according to touch patterns of the user. For example, whenever at least one of a touch down event and a touch up event is followed by a sliding event within a preset time, the mobile terminal may accumulate information regarding touched locations. On the basis of the accumulated information, the mobile terminal may identify a frequently touched zone of the touch screen for opening or closing the slide and set the frequently touched zone as a delay zone. That is, the mobile terminal may set a delay zone through a process of learning patterns of touch events and slide events. This process may be performed as a calibration function, for example, when the mobile terminal is first initialized.

In the above description, different touch event application times are assigned to a delay zone and a non-delay zone. However, the present invention is not limited by this. For example, the mobile terminal may be designed to reduce the touch event application time for awaiting occurrence of a sliding event after occurrence of a touch down event and a touch up event. To achieve this, the mobile terminal may have to rapidly sense a sliding event after generation of a touch up event. For example, the mobile terminal may employ a slide sensor that is very sensitive to opening and closing of the slide. Alternatively, for early sensing of sliding motion, multiple slide sensors, like Hall effect sensors, may be installed at different locations in the mobile terminal.

Figure 5:
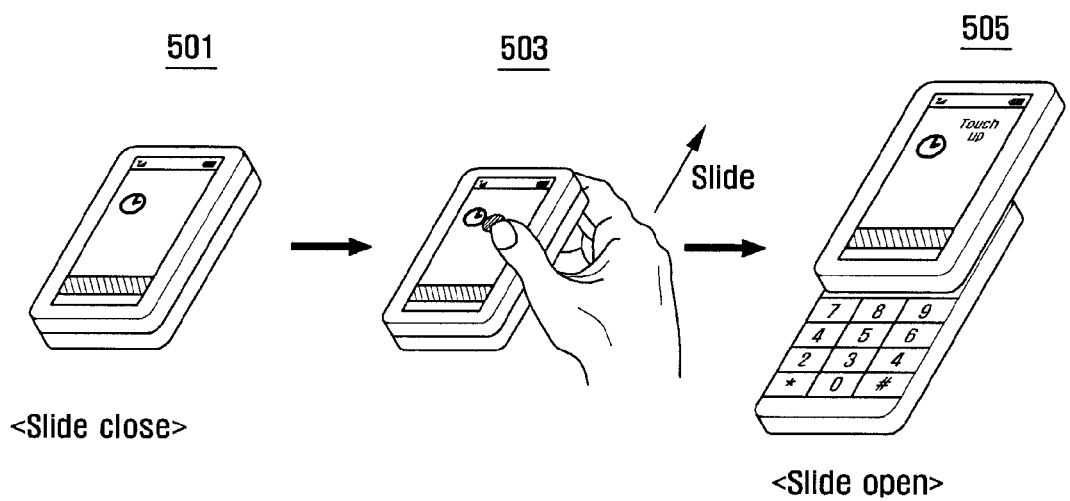
FIG. 5 is a second example depicting the external appearance of a slide type mobile terminal according to a slide opening operation.

FIG. 5 is a second example depicting prevention of unintended operation when the mobile terminal is transitioned from the slide-closed state to the slide-open state.

In FIG. 5 the mobile terminal is in the slide-closed state, as depicted by illustration 501. After being turned on, the mobile terminal may display a preset screen related to a specific program such as an idle screen or a menu screen, or one or more preset icons. For example, illustration 501 shows a clock icon (not labeled) displayed on the touch screen. Other icons or menu items (not shown) may also be displayed on zones of the touch screen.

The user may grip the mobile terminal placed in the slide-closed state and may touch a portion of the touch screen with a finger to open the slide of the mobile terminal, as shown by illustration 503. For example, to open the slide of the mobile terminal, the user may grip the slide type mobile terminal with the right hand by supporting the side and back of the mobile terminal with four fingers. Thereafter, the user may place the thumb on the touch screen and apply a force upwards as shown by illustration 503. Here, the direction of a force applied to a mobile terminal may be determined according to the slide type of the mobile terminal. For example, if opening of the slide requires downward movement, the user may apply a force downwards through the thumb. If opening of the slide requires rotational, leftward, rightward, or diagonal movement, the user may apply a force using the thumb in the corresponding direction.

When the thumb touches a portion of the touch screen as shown by illustration 503, the mobile terminal may generate a touch down event and send the touch down event to the control unit.

Thereafter, the user may initiate sliding motion of the mobile terminal with the thumb and may remove the thumb from the touch screen before or after the slide event has occurred. When the mobile terminal provides an elastic force for sliding motion, it is sufficient for the user to apply a force canceling the maximum frictional force through the thumb. As shown by illustration 505, the first assembly having the touch screen at the front may be slid over the second assembly having the input unit at the back. At this time, as the thumb is released from the touch screen, the touch sensor on the touch screen may generate a touch up event and send the touch up event to the control unit.

In the case where a touch down event or an extended touch down event is followed by a sliding event as depicted by illustration 503, the control unit of the mobile terminal may not deliver the touch down event (i.e., the thumb position has not been removed from the screen during the sliding process) to the related program. That is, the (extended) touch down event may be ignored by the control unit. In the case where a touch down event or an extended touch down event is followed by a sliding event as depicted by illustration 503 and further followed by a touch up event as depicted by illustration 505, the control unit of the mobile terminal may not deliver both the touch down event prior to the sliding event and the touch up event after the sliding event to the related program.

For example, assume that a clock icon changes size or displays the current time in numeric form in response to a touch by the user. Although a touch down event is generated by the thumb touching the clock icon, when it is followed by a sliding event within a preset time, the control unit may leave the clock icon unchanged. For the clock icon, when a touch down event is not followed by a sliding event within the preset time, or when a touch down event is followed by a touch up event without a sliding event, or when a touch down event is followed by a touch drag event, the control unit may deliver the touch event to the clock icon and control the behavior of the clock icon according to the touch event. For example, when a touch down event is followed by a touch drag event on the clock icon, the control unit may cause the clock icon to be moved. When a touch down event is followed by a touch up event on the clock icon, the control unit may cause the clock icon to display the current time in numeric form.

However, when a touch down event is followed by a touch drag event while the user opens or closes the slide, the control unit may not deliver the touch drag event to a related application program. That is, the control unit may have to determine whether a touch drag event following a touch down event is generated intentionally by the user or is accidentally generated by opening or closing the slide. When a touch down event is followed by a sliding event within a preset time, the control unit may ignore a touch drag event occurring during the preset time.

Figure 6:
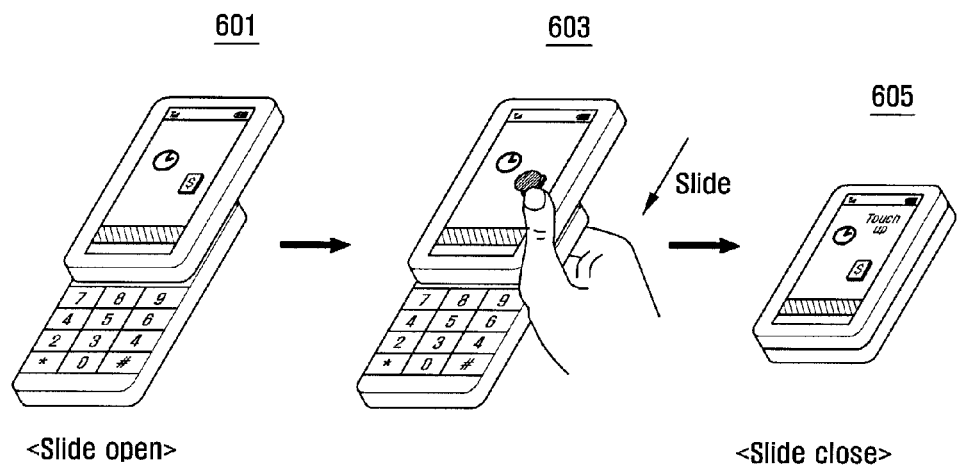
FIG. 6 is a second example depicting the external appearance of a slide type mobile terminal according to a slide closing operation.

FIG. 6 is a second example depicting prevention of unintended operation when the mobile terminal is transitioned from the slide open state to the slide closed state.

In FIG. 6 the mobile terminal is in the slide-open state, as depicted by illustration 60. After being turned on, the mobile terminal may display, on the touch screen, a preset screen related to a specific program such as an idle screen or a menu screen, or one or more preset icons or menu items related to various application programs. For example, a clock icon or a stock icon labeled '$' may be displayed on the touch screen as shown by illustration 601. Other icons or menu items may also be displayed on zones of the touch screen.

The user may grip the mobile terminal placed in the slide-open state as depicted by illustration 601, and may touch a portion of the touch screen with, for example, the thumb to close the slide as shown by illustration 603. To be more specific, to close the slide of the mobile terminal, the user may grip the mobile terminal, press a portion of the touch screen mounted on the first assembly with a finger or thumb, and move the pressed finger in a desired direction.

Here, when the thumb touches a portion of the touch screen, the touch sensor of the mobile terminal may generate a touch down event and send the touch down event to the control unit. The touch down event carries information on the touched location. As shown by illustration 603, the thumb touching the stock icon may cause the touch sensor to generate a touch down event carrying information on the touched location and to send the touch down event to the control unit. Hence, the control unit is aware of occurrence of a touch down event at the stock icon (clicking of the stock icon).

Thereafter, the user may initiate sliding motion of the mobile terminal with the thumb as depicted by illustration 603, and may remove the thumb from the touch screen as depicted by illustration 605. When the mobile terminal provides an elastic force for sliding motion, it is sufficient for the user to apply a force canceling the maximum frictional force through the thumb. The mobile terminal is transitioned from the slide open state to the slide closed state as shown by illustration 605. At this time, the slide sensor may generate a sliding event corresponding to sliding motion and send the sliding event to the control unit. As the thumb is released from the touch screen, the touch sensor may generate a touch up event and send the touch up event to the control unit.

As depicted by illustration 605, in response to occurrence of a sliding event, the control unit may control the related application program according to a touch down event prior to the sliding event and a touch up event after the sliding event. In other words, the control unit of the mobile terminal may ignore a touch down event occurring prior to a sliding event and a touch up event occurring after the sliding event.

Figure 7:
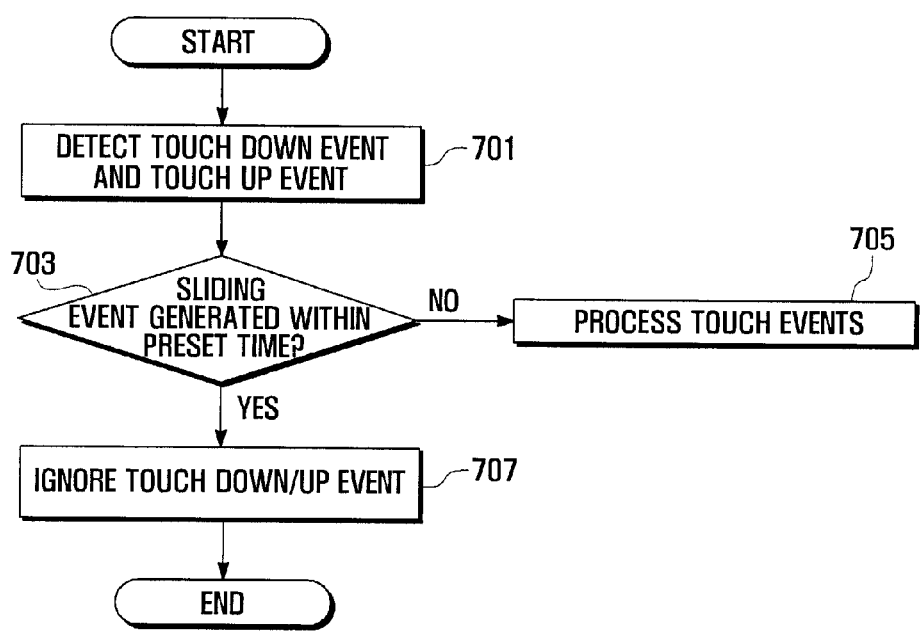
FIG. 7 is a flow chart illustrating a first method of preventing unintended operation according to another exemplary embodiment of the present invention.

FIG. 7 is a flow chart illustrating a first method of preventing an unintended operation according to an exemplary embodiment of the present invention.

Referring to FIG. 7, upon power on, the control unit of the mobile terminal performs a boot procedure, and initializes the individual components. These procedures are well-known in the art and need not be shown and described in detail herein. At this time, the mobile terminal may activate an application program and display a preset screen or icon related to a specific program such as an idle screen or menu screen on the touch screen. The control unit supplies power to the touch sensor and activates the touch sensor. The control unit associates the touch sensor with menus or icons displayed on the touch screen to enable the menus or icons to respond to a touch event.

In accordance with the principles of the invention, the control unit detects generation of a touch down event and a touch up event (701).

The control unit checks whether a sliding event is generated within a preset time after generation of the touch down event and touch up event (703). Here, the control unit activates the slide sensor, which then generates a sliding event corresponding to sliding motion of the mobile terminal. As described before, the slide sensor may be realized using various mechanisms including an on-off switch member and at least one Hall effect sensor, for example, capable of detecting sliding motion.

When a sliding event is not generated within the preset time, the control unit performs an operation according to the touch event (705). For example, the touch event is delivered to a related application program and processed.

However, when a sliding event is generated within the preset time, the control unit ignores the touch down event and touch up event occurring before the sliding event (707).

In summary, the mobile terminal of the present invention may ignore a touch down event and touch up event occurring immediately before a sliding event if the sliding event occurs within a preset time of one of the touch-down and the touch-up events. That is, such a touch down event and touch up event may not be delivered to the related application program.

As previously discussed, the control unit of the mobile terminal may set a delay zone of the touch screen according to user settings, and may assign a longer touch event application time to the delay zone in comparison to other zones of the touch screen. That is, when a touch event occurs at the delay zone, the control unit may buffer the touch down event and touch up event and process the buffered touch down event and touch up event after expiration of the longer touch event application time assigned to the delay zone. The delay zone may be set to the most frequently touched zone during utilization of the mobile terminal. The touch event application time for awaiting occurrence of a sliding event after occurrence of a touch down event and a touch up event may depend on structural properties of the mobile terminal. Hence, for early sensing of sliding motion, multiple slide sensors may be installed at different locations in the mobile terminal.

Figure 8:
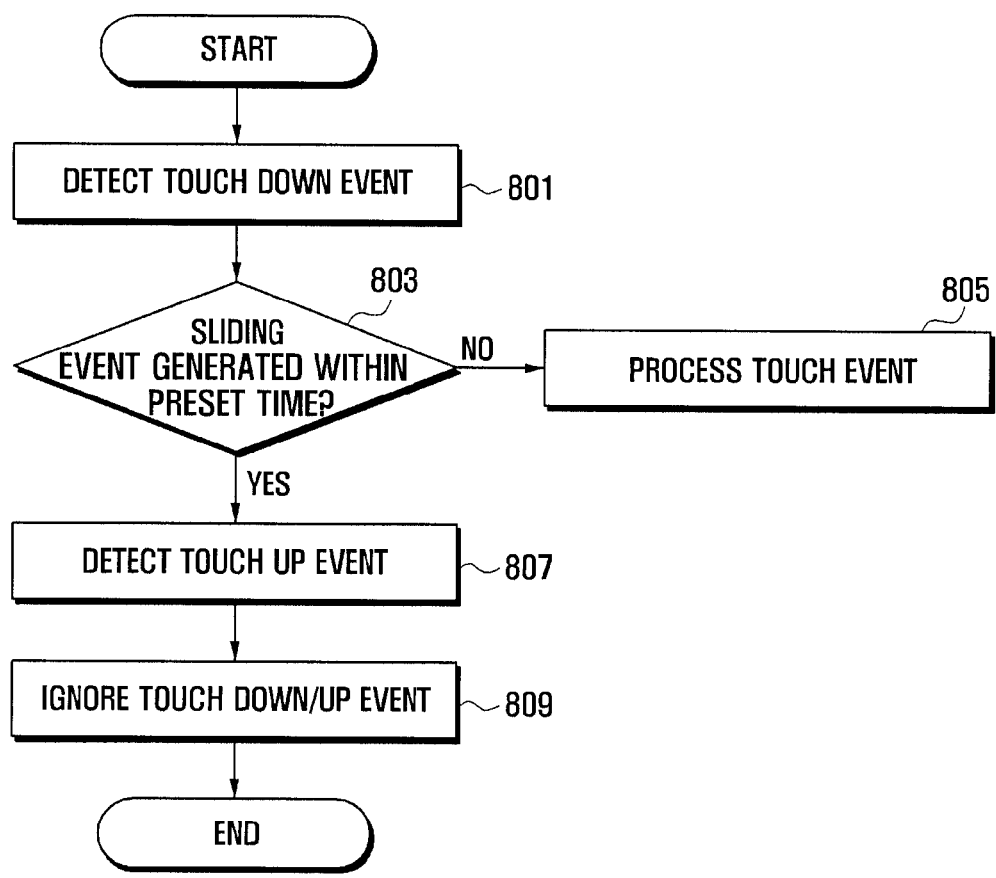
FIG. 8 is a flow chart illustrating a second method of preventing unintended operation according to another exemplary embodiment of the present invention.

FIG. 8 is a flow chart illustrating a second method of preventing unintended operation according to another exemplary embodiment of the present invention.

Referring to FIG. 8, upon power on, the control unit of the mobile terminal performs a boot procedure, and initializes the individual components, as previously discussed. At this time, the mobile terminal may activate a preset application program and display a preset screen or icon related to a specific program such as an idle screen or menu screen on the touch screen. The control unit supplies power to the touch sensor and activates the touch sensor. The control unit associates the touch sensor with menus or icons displayed on the touch screen to enable the menus or icons to respond to a touch event.

The control unit then detects generation of a touch down event (801).

The control unit checks whether a sliding event is generated within a preset time after generation of the touch down event (803). Here, the touch down event may be an extended touch down event. The control unit activates the slide sensor, which then generates a sliding event corresponding to sliding motion of the mobile terminal. As described before, the slide sensor may be realized using various mechanisms such as an on-off switch member capable of detecting sliding motion.

When a sliding event is not generated within the preset time, the control unit performs a control operation according to the touch event (805). For example, the touch event is delivered to a related application program and processed.

When a sliding event is generated within the preset time after the initial touch down event, the control unit detects generation of a touch up event (807). Here, when the user grips the mobile terminal and moves the first assembly having the touch screen at the front of the second assembly, sliding motion is generated and the thumb or a finger is released from the touch screen. Hence, the touch sensor may generate a touch up event.

In this case, the control unit ignores the touch down event and the touch up event occurring before and after the sliding event (809).

Thus, in accordance with this aspect of the invention, when a touch down event is followed by a touch drag event while the user opens or closes the slide, the control unit may not deliver the touch drag event to a related application program. That is, the control unit may have to determine whether a touch drag event following a touch down event is generated intentionally by the user or is accidentally generated by opening or closing the slide. When a touch down event is followed by a sliding event within a preset time, the control unit may ignore a touch drag event occurring during the preset time.

In summary, the mobile terminal may ignore a touch down event occurring before the sliding event and an event occurring after the sliding event if the sliding event occurs with a preset time from the touch-down event. That is, such a touch down event and touch up event may be not delivered to the related application program.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method for operating a mobile terminal, comprising:
   detecting touch on a touch screen by a touch sensor;
   generating a touch event in response to detecting the touch, the touch event comprising at least one of a touch down event and a touch up event;
   storing the touch event in a buffer;
   determining whether the touch is one of accidental or intentional by detecting whether a sliding event corresponding a sliding motion occurs within a present time in which the touch event is generated;
   ignoring the touch event by discarding the touch event stored in the buffer when the touch event is determined to be accidental when a sliding event corresponding to sliding motion occurs within a preset time duration; and
   processing the touch event as intentional when the sliding event corresponding to sliding motion does not occur within the preset time duration,
   setting a delay zone on the touch screen, wherein setting a delay zone on the touch screen at which a buffering time for the touch event generated at the delay zone is longer than a buffering time for the touch event generated at a non-delay zone, and wherein a left-zone or a right zone is set as the delay zone according by a user changeable default.

2. The method of claim 1, wherein setting a delay zone on the touch screen comprises at least one of:
setting a central zone of the touch screen as a central delay zone; and
setting a lower zone of the touch screen as a lower delay zone.

3. The method of claim 2, wherein setting a central zone comprises:
subdividing the central zone into a left central zone and a right central zone; and
setting the left central zone as a left central delay zone, and setting the right central zone as a right central delay zone.

4. The method of claim 2, wherein setting a lower zone comprises:
subdividing the lower zone into a lower left zone and a lower right zone; and
setting the lower left zone as a lower left delay zone, and setting the lower right zone as a lower right delay zone.

5. The method of claim 1, further comprising:
assigning a longer buffering time for a touch event generated at a zone containing frequently touched locations in comparison to that for a touch event generated at another zone.

6. The method of claim 1, wherein generating the sliding event corresponding to a motion comprises one of:
the mobile terminal is transitioned from a slide-open state to a slide-closed state; and
the mobile terminal is transitioned from the slide closed state to the slide open state.

7. The method of claim 1, wherein the sliding event corresponding to a motion comprises at least one of:
a first assembly of the mobile terminal is slid with respect to a second assembly of the mobile terminal in a predetermined direction; and
the first assembly is rotated by a predetermined number of degrees with respect to the second assembly.

8. The method of claim 1, wherein ignoring the touch event comprises not delivering to a related application program the touch event, when the touch down event is followed by the sliding event and further followed by the touch up event.

9. The method of claim 1, further comprising:
generating a touch drag event after generation of the touch down event and before generation of the sliding event; and
ignoring the touch drag event by not delivering the touch drag event to the related application program.

10. A mobile terminal comprising:
a first assembly having a touch screen having a display unit and a touch sensor that senses touch on the touch screen;
a second assembly coupled to the first assembly and supporting a movement of the first assembly,
a slide sensor for sensing sliding motion between the first assembly and the second assembly;
a buffer for storing a touch event, the touch event comprising at least one of a touch down event and a touch up event; and
a control unit for determining whether the touch event is accidental or intentional based on sensing whether sliding motion occurs within a preset time duration of the touch event, the control unit ignoring the touch event by discarding the touch event stored in the buffer, when the sliding motion is sensed as having occurred within the preset time duration, and
wherein the touch screen includes a delay zone at which a buffering time for the touch event generated at the delay zone is longer than a buffering time for the touch event generated at a non-delay zone, and wherein the buffer data is discarded when the touch event is accidental, and
wherein a left-zone or a right zone is set as the delay zone according by a user changeable default.

11. The mobile terminal of claim 10, wherein the slide sensor senses sliding motion when at least one of:
the first assembly is slid with respect to the second assembly in a predetermined direction; and
the first assembly is rotated by a predetermined number of degrees with respect to the second assembly.

12. The mobile terminal of claim 10, wherein the touch screen further comprises at least one of a central zone near the center of the touch screen set as a central delay zone and a lower zone of the touch screen set as a lower delay zone.

13. The mobile terminal of claim 12, wherein the central zone is subdivided into a left central zone set as a left central delay zone and a right central zone set as a right central delay zone, and the lower zone is subdivided into a lower left zone set as a lower left delay zone and a lower right zone set as a lower right delay zone.

14. The mobile terminal of claim 10, further comprising:
a storage unit storing accumulated information regarding touched locations of the touch screen, wherein the control unit sets a delay zone containing frequently touched locations by assigning a longer buffering time for a touch event generated at the delay zone in comparison to that for a touch event generated at a non delay zone.

15. The mobile terminal of claim 10, wherein the control unit ignores the touch event by not delivering the touch event to the related application program, when a touch down event is followed by a movement event and further followed by a touch up event.

16. The mobile terminal of claim 10, wherein the control unit ignores the touch event by not delivering a touch drag event to the related application program, when the touch drag event is generated by a user after generation of a touch down event and before generation of a movement event.

* * * * *

UNITED STATES PATENT AND TRADEMARK OFFICE
CERTIFICATE OF CORRECTION

| | | |
|---|---|---|
| PATENT NO. | : 8,787,994 B2 | Page 1 of 1 |
| APPLICATION NO. | : 12/701911 | |
| DATED | : July 22, 2014 | |
| INVENTOR(S) | : Dong Joon Park et al. | |

It is certified that error appears in the above-identified patent and that said Letters Patent is hereby corrected as shown below:

In the Claims

Column 14, Claim 1, Lines 56 to 57 should read as follows:
--...corresponding to a sliding...--

Column 15, Claim 1, Line 4 should read as follows:
--...a right-zone is set...--

Column 15, Claim 1, Line 5 should read as follows:
--...according to a user...--

Column 15, Claim 6, Lines 34 to 35 should read as follows:
--...the slide-closed state...--

Column 15, Claim 6, Line 35 should read as follows:
--...the slide-open state...--

Column 16, Claim 10, Line 20 should read as follows:
--...a right-zone is set...--

Column 16, Claim 10, Line 21 should read as follows:
--...according to a user...--

Column 16, Claim 14, Line 44 should read as follows:
--...a non-delay zone...--

Signed and Sealed this
Sixteenth Day of September, 2014

Michelle K. Lee
*Deputy Director of the United States Patent and Trademark Office*